March 1, 1960

F. A. WERSTEIN 2,926,353

CHUCK AND HANDLE FOR MANUAL INSTALLATION
OF SELF-DRILLING EXPANSION SHELLS

Filed April 21, 1958

INVENTOR:
FRANK A. WERSTEIN
BY
Silverman, Mullin & Cass

ATT'YS

United States Patent Office 2,926,353
Patented Mar. 1, 1960

2,926,353

CHUCK AND HANDLE FOR MANUAL INSTALLATION OF SELF-DRILLING EXPANSION SHELLS

Frank A. Werstein, Long Beach, Ind., assignor to Phillips Drill Company, Michigan City, Ind., a corporation of Illinois Application April 21, 1958, Serial No. 729,835

16 Claims. (Cl. 1—49.8)

This invention relates generally to tools for anchoring or installing self-drilling expansion shells in concrete, brick, masonry or the like surfaces and more particularly, is concerned with a novel chuck and handle for manually installing such shells.

Expansion shells of the type with which the tool embodying the invention is concerned have been used for many years in diversified manners, such as for instance, to hang sprinkler systems, secure pipes, beams and conduits, to mount heavy machinery and other apparatus. Such expansion shells are shown and described in U.S. Patents Nos. 1,746,050, 1,786,029, 1,996,121, among others from whence it may be appreciated that these shells comprise generally elongate, cylindrical bodies each having hardened teeth at one axial end thereof, and a tapered frusto-conical end opposite that of said toothed formation. The shells are formed of steel with an axial bore throughout the length thereof, and the toothed formation end has axially extending fracture grooves cut in the wall thereof extending a substantial distance inwardly from the teeth. These fracture grooves are circumferentially spaced about the shell body so as to enable the toothed end to uniformly split and spread when the shell is installed. The frusto-conical end preferably is severable from the remainder of the shell body by means of a deep annular fracture groove and the axial bore is threaded to accommodate a bolt of some standard size. Shells of similar nature having modified constructions, from that described have also been known and used extensively.

In the installation of such shells, there is utilized a chuck member having a complementary female socket in which the frusto-conical end of the shell is frictionally engaged. Percussive forces for driving the shell have been obtained from power driven hammers to which the chuck in turn is mounted, such as the type of mechanical hammer shown and described in U.S. Patent No. 1,484,845 or the type of electrical hammer shown and described in U.S. Patent No. 1,968,055. First, the shell is driven directly into the mounting surface by repeated blows from the hammer while the chuck is simultaneously turned back and forth to permit the cutting teeth of the shell to form a smooth hole. The cuttings and debris pass up the axial bore of the shell, through a passageway provided in the chuck and thence, out through a communicating transverse passageway in the chuck. When the shell has drilled a hole to a depth approximately at the location of the annular fracture groove, the shell is removed and the hole is cleaned. A hardened steel conical plug is engaged in said toothed end and the shell is inserted again in the self-drilled hole and hammered home. The tapered plug functions to rupture the shell along the longitudinally extending fracture lines causing the split toothed end of the shell to bite into the walls of the hole to permanently anchor the shell body therein.

It is then possible to sever the frusto-conical end of the shell from the portion of the shell body anchored in the hole by a quick lateral movement whereupon said frusto-conical end breaks off at the annular fracture groove. The end of the shell still retained in the chuck is removed by means of a suitable ejector instrument, such as for example, a rod having a flattened side inserted into the transverse passageway previously mentioned as providing egress for debris and cuttings. Thereafter, the chuck is ready to accept another expansion shell.

In order to enable rocking or oscillation of the shell body during application of the percussive forces, a handle secured to the chuck has been employed, such handles generally being formed of steel rod bent to form a loop and provided at the end opposite the loop with inwardly facing aligned extensions transverse to the handle portion. The chuck is formed with a second transverse passageway substantially normal to the first mentioned transverse passageway. The short, facing extensions of the handle are telescoped into the opposite ends of the second transverse passageway so that the handle is capable of rotating the chuck and is, itself, swingable on an axis normal to the axis of the chuck.

Other types of expansion shells in which the said frusto-conical end structure is not used also are known, such shells being formed with simple cylindrical ends suitably drilled and tapped for threaded engagement with a stem or stud which is provided on the chuck. Such a structure is shown in U.S. Patent 1,244,992, however, there are recognized difficulties in connection with the use of such shells. Principally, such shells have a tendency to back off the threaded stem or stud during the hammering process and in order to prevent this phenomenon, instead of swinging the chuck back and forth, the practice was to rotate the chuck unidirectionally. After the shell was anchored in the mounting surface, the stud had to be unscrewed. These difficulties have been alleviated to some extent, insofar as flush end shells are concerned, by the invention of U.S. Patent 2,794,622, but another difficulty has been present in the installation of small size shells, especially.

In my co-pending application entitled, Chuck and Handle for Manual Installation of Self-Drilling Expansion Shells, Serial No. 729,834 which was filed April 21, 1958, there is disclosed and claimed a chuck and handle structure which successfully solves problems of long standing in connection with the installation of small sizes of shells manually by providing a structure which enables simple, rapid, economical, safe and effective installation of such shells even by inexperienced operators with the use of only a common hammer. The herein invention has for the object thereof, among others, the accomplishment of such superlative purposes in a manner substantially improved over the invention of said co-pending application.

As explained in said co-pending application, the mounting of the type of shell which telescopically received a threaded stem or stud provided on the chuck was considerably complicated in the flush end type of installation where the shell was of the order of ½ inch diameter or less. Since the stud was required to be solid, jamming of debris and cuttings in the center of the shell by reason of lack of egress therefor was common. In addition, it was common for the studs to break off inside the shells. Until the advent of this invenion as well as that of said co-pending application, the only small size of shell which could be driven manually was of the so-called flush end variety. Because of the need for a stud-end, the chuck actually consisted of a large shank of steel of cylindrical or hexagonal cross-section, having a stud protruding from one end thereof. These stud-ended chucks could not be employed with frusto-conical ended shells. As a consequence, the use of such shells has been limited to tradesmen who could afford to purchase the equipment needed to mechanically or electrically drive the shells for heavy-duty installations. The widespread need for relatively small sizes of shells for use in a much greater area of application was heretofore satisfied by relatively weak lead matrix fasteners, and by expensive and dangerous explosively driven fasteners.

In my co-pending application, there was described and claimed a handle and chuck for manual installation of self-drilling expansion shells of small sizes in which the chuck and handle had novel cooperative structure for removably securing the handle to the chuck body. After the hole for the shell had been drilled and the shell with the plug engaged in the toothed formation thereof driven home in its self-drilled hole, it was possible to sever the shell body at the annular fracture groove provided thereon. The handle structure was then removable from the chuck body for subsequent use in ejecting from the chuck the fragment of the shell still engaged therein. For this purpose, the opposite end of the handle had means provided thereon which could be engaged in the second transverse passageway provided in the chuck for ejecting the severed portion of the shell. The herein invention represents singular improvements over the structure of said co-pending application in that the handle need not be removed from the chuck body in order to enable functioning thereof to eject the severed portion of the expansion shell from the chuck. Accordingly, it is a principal object of this invention to provide an improved structure for a handle and chuck of the character described which is distinguished by the greater facility and ease of operation afforded thereby.

Another object of the invention is to provide an improved structure for a handle and chuck for manual installation of self-drilling expansion shells having novel shell ejector means, said means constructed and arranged also to assist in holding the chuck body on the handle during installation of the shell in certain forms of the invention.

A further object of the invention is to provide a handle and chuck of the character described in which the handle has ejector means comprising an elongate member having an end thereof disposed adjacent an end of the second transverse passageway provided in the chuck, said end of the elongate member being offset from the major portion of the elongate member and having an ejector device mounted thereon engaged in said transverse passageway and selectively movable to eject the shell fragment engaged in the chuck.

Further objects of the invention reside in the provision of a tool of the character described in which the handle thereof may either be permanently or removably attached to a chuck, in the latter instance, removable installation of the handle permitting use thereof with chucks of different sizes.

Another object of the invention is to provide a chuck and handle as described in which the handle has a step-formation adjacent the operative end thereof engaged with the chuck which permits the user to obtain better and more convenient purchase on the handle with respect to the mounting surface in which the shell is to be mounted.

The foregoing and other objects of the invention will become apparent from the ensuing description in which a preferred embodiment of the invention has been given detailed treatment in the specification and illustrated in the accompanying drawing. Variations in structure are contemplated without circumventing the principles upon which the invention is operative.

Figure 1:
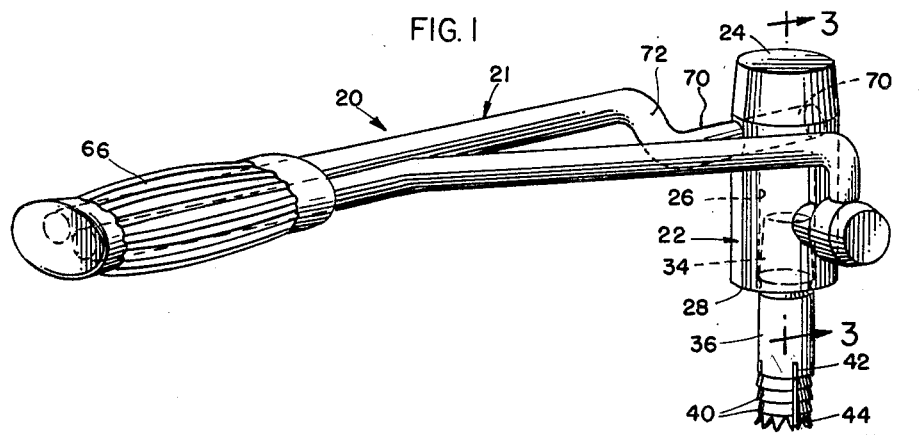
Fig. 1 is a perspective view of the chuck and handle structure embodying the invention, there being an expansion shell of the frusto-conical end type shown secured within the bore of the chuck.
Figure 2:
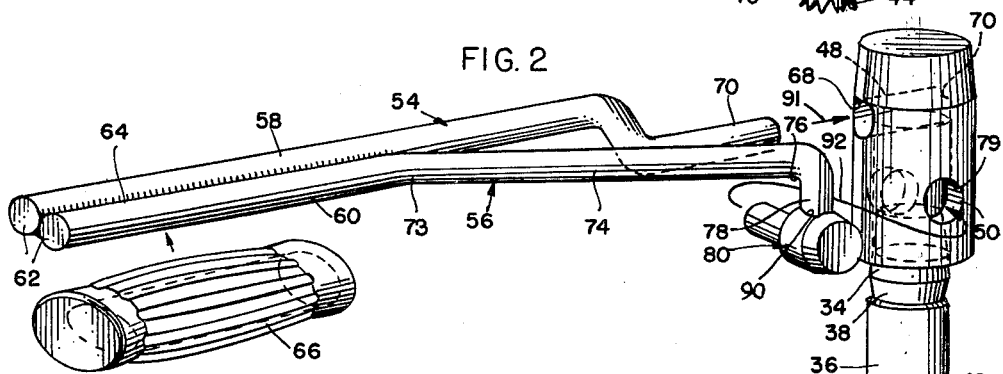
Fig. 2 is a perspective view similar to that of Fig. 1 except that the handle has been removed from the chuck of Fig. 1 and is shown in exploded position alongside a larger chuck for accommodating a larger size of expansion shell.

Referring now to the drawing, illustrated in Figs. 1 and 2 is a tool structure designated generally by the reference character 20 which comprises a handle 21 and chuck 22 constructed and assembled in accordance with this invention. The chuck 22 is in the form of an elongate, cylindrical body of steel, suitably heat-treated, either entirely or selectively, to provide any desirable toughness or hardness characteristics. Thus, the upper or impact end 24 against which percussive forces of the hammer are applied may be softer than the remainder of the chuck body to prevent shock and possible cracking, this being an expedient which is known and not important to the invention. The upper end 24 is imperforate, and may be somewhat tapered to compensate for likelihood of spreading under impacts applied thereagainst.

Figure 3:
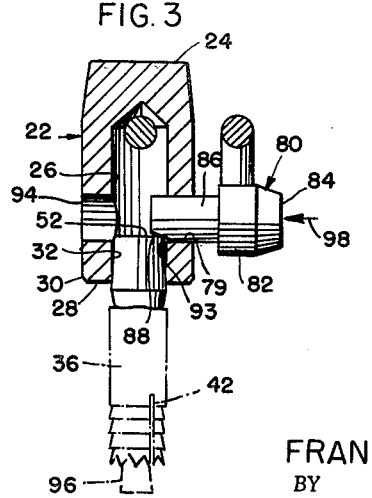
Fig. 3 is a sectional view taken through the chuck along the line 3—3 of Fig. 1 and in the direction indicated.

The chuck 22 has a vertical axial passageway 26 bored up the center thereof which terminates short of the impact end 24 to provide sufficient strength for constituting said end an impact head. The opposite or bottom end 28 of the shell body is planar and the annular edges thereof may be beveled to avoid sharp corners, as shown at 30. Passageway 26, which may be referred to as the axial bore, has its forward end preferably divergently tapered outwardly to form a socket 32 into which the frusto-conical end 34 of the expansion shell 36 may be telescopically engaged. The annular fracture groove 38 of the shell is best seen in Figs. 2 and 3 immediately below the frusto-conical end 34. Annular ridges 40 are provided on the shell body which assist in drilling, and the axially extending fracture grooves are shown at 42 terminating at the toothed end 44 of the shell.

Chuck 22 has a pair of transverse passageways 48 and 50 which are substantially perpendicular to one another and both of which have their axes intersecting the axis of the axial bore 26. The lower passageway 50 is required to intersect bore 26. The entrances to said passageways may be slightly countersunk to eliminate burrs and facilitate reception of parts axially therein. The dimensions of the bore 26, the tapered socket 32, and dimensional relationship of the same with transverse passageway 50 are such that when shell 36 is wedgingly engaged in socket 32, the extreme end 52 of frusto-conical end 34 (Fig. 3) protrudes slightly into the lower confines of passageway 50 and in effect, traverse the same.

The tool 20 embodying the invention is an assemblage comprised of handle part 21 and chuck 22. The handle 21 is comprised of a pair of elongate steel rods 54 and 56 each of which may be formed of the same stock of uniform diameter and shaped along their lengths in a preferential manner. Rod 54 includes a straight segment 58 and rod 56 includes a straight segment 60 which are juxtaposed with their respective ends flush as indicated at 62 and said segments are rigidly conjoined along their contiguous surfaces preferably by a weld joint such as indicated at 64 to provide a purchase portion by which the tool 20 may be held during its use. A flexible hand grip 66 may be provided adapted to be frictionally engaged over the conjoined segments as illustrated in Fig. 1.

Rod 54 is designed to be engaged with the chuck 22 in the passageway 48, the entrance to which is indicated at 68. Said passageway 48 has been shown to intersect axial bore 26 but it need not do so and it need not extend entirely through the chuck. At its extremity opposite end 62, the rod 54 has a short straight segment 70 which is offset below the straight segment 58 by reason of the intermediate downwardly extending step formation 72 formed in said rod. The segment 70 is insertable in passageway 48 and may conveniently engage against the annular surface of axial bore 26, said segment extending outwardly of entrance 68 a short distance so that step formation 72 is located laterally spaced from the chuck 22 in the installed position of rod 54. The provision of the downward extending step formation 72 spaced from the chuck 22 enables the operator also to obtain a purchase on the rod 54 close to the chuck during hammering of the shell without having his hand or fingers contact the mounting surface.

Rod 56 has a lateral bend 73 in the medial portion thereof adjacent segment 60 to provide a straight segment 74 extending laterally outward at an angle from rod 54 and generally in the same horizontal plane as segment 58. The length of segment 74 and its angle of divergence from rod 54 is such that the segment 74 can clear chuck 22 and reach opposite the passageway 50 where same has a right angle bend 76 to provide a short extension or segment 78 facing downwardly. The segment 78 is located approximately aligned with the entrance 79 to passageway 50 and laterally spaced from the chuck 22. Mounted on the segment 78 is an ejector member 80 constructed to be telescopically engaged through entrance 79 in the passageway 50.

The ejector member 80 preferably is formed as an integral steel or other hard metal member and includes a cylindrical body portion 82 of which one end 84 is preferably tapered to provide an impact end or head. Axially extending from the opposite end face of said portion 82 is a plug or stud 86 which is coaxial with the portion 82. The plug or stud 86 is of cross-sectional configuration complementary with that of the passageway 50 and at its free extremity, said plug has a tapered flat portion 88. The cylindrical portion 82 has a passageway 90 therein which is substantially normal to the longitudinal axis of said portion 82 and of suitable configuration to seat the short segment 78 therein. Thus, the plug or stud 86 may be seen to be arranged at right angle to the segment 78 and in registry with the passageway 50.

Referring to Fig. 2, to assemble the chuck and handle parts, segment 70 is telescopically engaged in the passageway 48 in the direction of arrow 91. To seat plug or stud 86 to ride upon the annular surface of the chuck 22 from the rod 54 by causing the free extremity of plug or stud 86 to rid upon the annular surface of the chuck 22 and become aligned with entrance 79, this movement being indicated by the arrow 92. Such spreading movement of segment 74 is permitted by reason of the limited resiliency of the rod 56 at the bend 73. When the plug 86 enters the passageway 50, the segment 74 automatically returns to its normal position relative segment 58. The length of the plug or stud 86 is selected so that in its normal installed position in the passageway 50, the tapered flat portion 88 will face the end 52 of frusto-conical end 34 and engage said end 52 at a medial location on said portion 88 as indicated at 93. It may be noted from Fig. 3 that the passageway 50 opens to the annular surface of chuck 22 at its opposite end 94.

In use, the chuck and handle structure is arranged as illustrated in Figs. 1 and 3, the shell 36 being engaged in the tapered socket 32. The handle 21 is held by the grip member 66 with the toothed end 44 engaged against the masonry or concrete. With a hammer held in the other hand, the operator lightly taps the impact head 24 of the chuck and commences to rock the chuck back and forth by swinging the handle about the axis of bore 26. The shell 36 cuts its own hole and the debris and cuttings from said hole pass up the hollow shell and then outwardly of the chuck 22 through end 94 of passageway 50. After the shell has been caused to penetrate the mounting surface to about the annular fracture groove 38, the chuck 22 is lifted, pulling the shell out with it. The resulting hole is cleaned, a tapered end plug 96 (Fig. 3) is inserted into the toothed end 44 and the shell reinserted in the hole with plug 96 at the root of the hole. The operator finally seats the shell by again hammering on impact end 24, but without rocking the chuck back and forth. The toothed end 44 expands along the fracture grooves 42 to anchor the shell, as previously explained. To sever the frusto-conical end 34 from the anchored shell body, the operator may quickly lift up on the handle in the case of small shell sizes, or strike the chuck on its side for the larger shell sizes.

To eject the severed end 34 still engaged in the socket 32, the operator may strike the impact end 84 of the ejector member 80 or swing the entire device 20 to strike the end 84 against a hard surface. Force applied axially against the end 84 in the direction of the arrow 98 causes the stud or plug 86 to move inwardly against the limited resilience of the rod 56 into the intersection of the passageway 50 with the axial bore 26. The wedging force applied to the end 52 of the frusto-conical end 34 by the flattened portion 88 causes the said end 34 to be ejected and the structure 20 is ready for use with another shell.

It will be appreciated the the chuck 22 may be permanently connected with the handle for use with a particular size of shell suitable for engagement in the socket 32. In the arrangement described, however, it is highly advantageous to have the handle assemblage removable from the chuck so that different sizes of chucks may be substituted for use with different sizes of shells. Attention is invited to the illustration of two different sizes of chucks and shells in Figs. 1 and 2 respectively. The only difference between the chucks of Figs. 1 and 2 is in the dimensions of the socket 32. Obviously, the dimensions of the transverse passageways and their relative locations must be substantially the same.

The removability of the handle and ejector assemblage gives rise to many advantages, in addition to the fact that the device can be used both in installing the shells and ejecting the broken fragments without disassembling the same from the chuck, and in addition to the interchangeability of chucks for different sizes. The breakage of handles or ejector means, wearing out or breakage of chucks is no problem, since one merely disassembles the device and replaces the broken or worn parts with new ones.

It will be appreciated that it is impossible to remove the chuck 22 from the handle and ejector assemblage without withdrawing the plug or stud from the passageway 50. Since the segment 70 is merely linearly inserted into the chuck in the structure where the same is not permanently secured, it cannot remain attached to the chuck without some additional means to prevent its withdrawal from the passageway 48. The ejector member 80 and its connecting means 74 serve as means to establish the position of the segment 70 relative the chuck and prevent any axial movement thereof. This does not in any way prevent the required axial rocking which must be accomplished during installation of shells.

In addition, the presence of the ejector member 80 solves another important problem in the use of this form of tool. In using the apparatus of the type described and claimed in my co-pending application, various means had to be provided where it was desired to prevent rotation of the chuck 22 about the axis of the handle, i.e., about the axis of the segment 70. This is important where the tool is used in installing shells in vertical walls and ceilings. In manual installation, one hand of the user must be free to swing the hammer, and hence the handle, chuck and shell must act as a unitary assemblage so that the shell can be accurately placed. The presence of the ejector means 80 in the structure 20 of this invention, in addition to preventing withdrawal of the handle member 70 and serving to enable facile ejection of the broken fragment of an installed shell, prevents the chuck from rotating about the axis of the handle. The unusual nature of this arrangement is that the ejector member 80 so functions notwithstanding that the entire handle assemblage is readily removable from the chuck merely by spreading the segments 74 and 70 and withdrawing the ejector member 80 from its passageway 50 as described.

The structure herein, when compared with those described in my co-pending application, may be expected to require somewhat additional manufacturing steps and perhaps additional materials, but the added advantages can be expected to more than compensate for any possible increase in cost. Where the tool is to be used extensively, as for example by a tradesman who prefers to install the shells manually instead of by using percussive hammers, or for example by an operator who has a great many small size shells to install and cannot do so with electric or spring hammers, the difference in price will be immaterial. The added advantages of speed of installation and the elimination of the need for separating the handle from the chuck for ejecting the fragments are extremely important and worthwhile, even to the occasional user of the apparatus.

It is contemplated that the skilled artisan may devise modifications in the construction, arrangement and proportion of the several parts of structure 20 without departing from the governing principles of the invention. In construing the invention set forth in the claims hereto appended, a liberal interpretation is intended commensurate with the progress in the arts and sciences contributed by this invention.

What it is desired to secure by Letters Patent of the United States is:

1. A tool for use in installing self-drilling expansion shells comprising, a chuck having a shell-receiving socket at one end thereof and an impact receiving formation at the end opposite said socket end, a transversely extending passageway in said chuck having an intersection with said socket and a discharge opening in a surface of said chuck for debris entering said passageway through the interior of the shell, a unitary assemblage comprising handle means and ejector means, secured to said chuck for use in holding said chuck while installing an expansion shell therewith and ejecting a shell fragment from said socket by selective movement of said ejector means in said passageway without dissociating said assemblage from said chuck.

2. A tool as described in claim 1 in which said handle means comprises an elongate rod member having an end thereof secured to said chuck and said ejector means is movably disposed in said passageway.

3. A tool as described in claim 2 in which said chuck has a second transverse passageway and said rod is telescopically engaged in said second passageway.

4. A tool as described in claim 1 in which said handle means comprises an elongate member having an end engaged with said chuck and said ejector means comprises a reciprocable member disposed in said passageway and movable into said intersection and means are provided connecting said elongate and reciprocable members.

5. A tool as described in claim 4 in which said last-mentioned means is resilient such that said reciprocable member is normally disposed out of said intersection and is biased to oppose movement into said intersection.

6. A tool as described in claim 1 in which said ejector means comprises a member having an impact head and a reduced diameter portion opposite said head engaged in said passageway with the impact head external of said passageway, and pressure applied to said head serving to drive said reduced diameter portion into said intersection.

7. A tool as described in claim 1 in which said assemblage is removable from said chuck.

8. A tool for the manual installation of self-drilling expansion shells comprising, a chuck body having an axial bore including a socket opening to one end of the chuck body and an impact receiving formation at its end opposite said socket end, a pair of transverse passageways axially spaced along the chuck body each opening to a surface of the chuck body, one of said passageways being in closer proximity to the impact receiving formation than the second passageway and the second passageway intersecting said axial bore and opening to opposite sides of the chuck body, combination handle means and ejector means secured to the chuck body, said handle means being engaged in the first passageway for use in holding the chuck and the ejector means being engaged in the second passageway through one of said openings for ejecting a shell fragment from the socket opening without withdrawal of the handle means from the first passageway.

9. A tool as described in claim 8 in which said handle means and ejector means each include an elongate rod and the rods are conjoined adjacent juxtaposed ends thereof, the handle means and ejector means being provided at the opposite ends respectively of said rods.

10. A tool as described in claim 9 in which said ejector means includes a movable ejector member, secured on said opposite end of the rod of the ejector means, said ejector member being operably engaged in said second passageway through one opening thereof.

11. A tool as described in claim 8 in which said handle means is removably secured in said first passageway and the ejector means prevent withdrawal of the handle means from said first passageway, the second passageway having one of said openings thereof unobstructed to provide egress for debris entering the second passageway.

12. A tool as described in claim 8 in which said handle means comprises an elongate rod member, one end of said rod member being rigidly connected to the ejector means and the second end of the rod member being offset relative said first end and secured to said chuck body.

13. A tool for manual installation of self-drilling expansion shells comprising, an elongate, cylindrical chuck body having an axial bore opening to one end of the chuck body for receiving a shell therein and in impact head at the opposite end thereof, a transverse passageway intersecting said axial bore and opening at opposite ends thereof to lateral surfaces of the chuck body, and a combination handle and ejector secured to the chuck, said ejector being engaged in one end of said passageway in operative position for ejecting an article from said bore through said open end thereof, said passageway having one opening thereof unobstructed for egress of debris entering the same through the shell.

14. A tool as described in claim 13 in which the handle and ejector and chuck are removably secured together.

15. In a handle structure adapted to be secured to a chuck body for mounting self-drilling expansion shells in a masonry or the like surface, said chuck body having a socket opening at one end thereof for holding the shell and a transverse passageway intersecting the socket to provide a discharge opening for cuttings entering said passageway, an ejector member for ejecting a shell fragment from said socket comprising an elongate rod having a first segment adapted to be secured to said handle, a second segment divergent from said first segment and connected therewith, said second segment being of sufficient length to reach adjacent said chuck with the second end thereof laterally spaced from and aligned with said passageway, there being an ejector formation provided on said second end having an axial extension thereof adapted to be movably engaged in said passageway.

16. In combination, a chuck body having an axial socket in one end thereof for receiving a self-drilling expansion shell to be installed in a masonry or like surface, a transverse discharge passageway in the chuck body connecting with the socket and a surface of the chuck body for cuttings passing through the interior of the shell into the passageway during installation of the shell, and a combined handle and ejector device comprising, a handle member secured to the chuck body spaced from the passageway for holding the chuck body during installation of the shell and an ejector member supported by said handle and selectively movable independently of the handle transverse of the axis of the socket for separating a shell end from the socket without disengaging the handle from the chuck body.

References Cited in the file of this patent

UNITED STATES PATENTS 2,829,898     Tilden _____ Apr. 8, 1958